(12) United States Patent
Ma et al.

(10) Patent No.: US 11,971,712 B2
(45) Date of Patent: Apr. 30, 2024

(54) SELF-AWARE VISUAL-TEXTUAL CO-GROUNDED NAVIGATION AGENT

(71) Applicant: Salesforce, Inc., San Francisco, CA (US)

(72) Inventors: Chih-Yao Ma, San Francisco, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 373 days.

(21) Appl. No.: 17/332,756

(22) Filed: May 27, 2021

(65) Prior Publication Data

US 2021/0286369 A1 Sep. 16, 2021

Related U.S. Application Data

(63) Continuation of application No. 16/176,955, filed on Oct. 31, 2018, now Pat. No. 11,029,694.

(Continued)

(51) Int. Cl.
*G05D 1/00* (2006.01)
*B25J 9/00* (2006.01)

(Continued)

(52) U.S. Cl.
CPC .......... *G05D 1/0016* (2013.01); *B25J 9/0003* (2013.01); *B25J 9/1697* (2013.01);

(Continued)

(58) Field of Classification Search
CPC ............ G06N 3/08; G06N 3/02; G06N 20/00; G05D 1/0016; G06V 10/454; G06V 10/82;

(Continued)

(56) References Cited

U.S. PATENT DOCUMENTS 7,831,433 B1    11/2010   Belvin et al.
9,811,074 B1    11/2017   Aichele et al.
(Continued)

FOREIGN PATENT DOCUMENTS

JP    2011170844 A    9/2011
JP    2012216069 A    11/2012
JP    2017156511 A    9/2017

OTHER PUBLICATIONS

International Search Report and Written Opinion from PCT Patent Application No. PCT/US2019/053200, dated Dec. 11, 2019, pp. 1-15.

(Continued)

*Primary Examiner* — Jaime Figueroa
*Assistant Examiner* — Joshua Alexander Garza
(74) *Attorney, Agent, or Firm* — Haynes and Boone, LLP

(57) ABSTRACT

An agent for navigating a mobile automated system is disclosed herein. The navigation agent receives a navigation instruction and visual information for one or more observed images. The navigation agent is provided or equipped with self-awareness, which provides or supports the following abilities: identifying which direction to go or proceed by determining the part of the instruction that corresponds to the observed images (visual grounding), and identifying which part of the instruction has been completed or ongoing and which part is potentially needed for the next action selection (textual grounding). In some embodiments, the navigation agent applies regularization to ensures that the grounded instruction can correctly be used to estimate the progress made towards the navigation goal (progress monitoring).

20 Claims, 6 Drawing Sheets

Related U.S. Application Data

(60) Provisional application No. 62/737,684, filed on Sep. 27, 2018.

(51) Int. Cl.

| | | |
|---|---|---|
| *B25J 9/16* | (2006.01) | |
| *G05D 1/02* | (2020.01) | |
| *G06F 3/16* | (2006.01) | |
| *G06N 3/02* | (2006.01) | |
| *G06N 3/08* | (2023.01) | |
| *G06N 20/00* | (2019.01) | |
| *G06V 10/44* | (2022.01) | |
| *G06V 10/764* | (2022.01) | |
| *G06V 10/80* | (2022.01) | |
| *G06V 10/82* | (2022.01) | |
| *G06V 20/10* | (2022.01) | |

(52) U.S. Cl.
CPC ........... *G05D 1/0221* (2013.01); *G06F 3/167* (2013.01); *G06N 3/02* (2013.01); *G06N 3/08* (2013.01); *G06N 20/00* (2019.01); *G06V 10/454* (2022.01); *G06V 10/764* (2022.01); *G06V 10/811* (2022.01); *G06V 10/82* (2022.01); *G06V 20/10* (2022.01)

(58) Field of Classification Search
CPC .... G06V 10/811; G06V 10/764; G06V 20/10; B25J 9/0003; B25J 9/1697
See application file for complete search history.

(56) References Cited

U.S. PATENT DOCUMENTS

| | | | |
|---|---|---|---|
| 10,282,663 B2 | 5/2019 | Socher et al. | |
| 10,346,721 B2 | 7/2019 | Albright et al. | |
| 10,366,166 B2 | 7/2019 | Yu et al. | |
| 10,474,709 B2 | 11/2019 | Paulus | |
| 10,521,465 B2 | 12/2019 | Paulus | |
| 10,606,898 B2 | 3/2020 | Tellex et al. | |
| 11,341,356 B2* | 5/2022 | Frossard | G06V 10/764 |
| 11,417,082 B2* | 8/2022 | Zheng | G06V 10/764 |
| 2016/0161946 A1 | 6/2016 | Wuth Sepulveda et al. | |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2018/0082171 A1 | 3/2018 | Merity et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0124423 A1* | 5/2018 | Choi | G06V 10/82 |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268220 A1* | 9/2018 | Lee | G06V 20/36 |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0373682 A1 | 12/2018 | McCann et al. | |
| 2018/0373987 A1 | 12/2018 | Zhang et al. | |
| 2019/0065939 A1 | 2/2019 | Bourgoin et al. | |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0188568 A1 | 6/2019 | Keskar et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Hosseini-Asl et al. | |
| 2019/0295530 A1 | 9/2019 | Hosseini-Asl et al. | |
| 2019/0362020 A1 | 11/2019 | Paulus et al. | |
| 2019/0362246 A1 | 11/2019 | Lin et al. | |
| 2020/0234468 A1 | 7/2020 | Lerchner et al. | |
| 2020/0241574 A1* | 7/2020 | Lin | G05D 1/0016 |
| 2020/0342643 A1 | 10/2020 | Gouws et al. | |

OTHER PUBLICATIONS

Hu et al., "Save Navigation with Human Instructions in Complex Scenes," arXiv: 1809.04280v1, dated Sep. 12, 2018, pp. 1-8.

Ma et al., "Self-Monitoring Navigation Agent via Auxiliary Progress Estimation," arXiv: 1901.03035v1, dated Jan. 10, 2019, pp. 1-18.

Mirowski et al., "Learning to Navigate in Cities without a Map," arXiv: 1804.00168v3, dated Jan. 10, 2019, pp. 1-17.

Anderson et al., "Vision-and-Language Navigation: Interpreting Visually-Grounded Navigation Instructions in Real Environments," in Proceedings of the IEEE Conference on Computer Vision and Pattern Recognition (CVPR), Salt Lake City, Utah, USA, Jun. 18-22, 2018. pp. 3674-3683.

Andreas et al., "Alignment-Based Compositional Semantics for Instruction Following," in Proceedings of the 2015 Conference on Empirical Methods in Natural Language Processing (EMNLP), Lisbon, Portugal, Sep. 17-21, 2015, pp. 1165-1174.

Antol et al., "VQA: Visual Question Answering," in Proceedings of the IEEE International Conference on Computer Vision (ICCV), Santiago, Chile, Dec. 7-13, 2015. pp. 2425-2433.

Artzi et al., "Weakly Supervised Learning of Semantic Parsers for Mapping Instructions to Actions," in Transactions of the Association of Computational Linguistics (ACL), Sofia, Bulgaria, Aug. 4-9, 2013, pp. 49-62.

Benn et al., "The Neural Basis of Monitoring Goal Progress," Frontiers in Human Neuroscience, vol. 8, Article 688, Sep. 10, 2014, pp. 1-15.

Berkman et al., "The Neuroscience of Goal Pursuit: Bridging Gaps Between Theory and Data," G. B. Moskowitz & H. Grant. (ed.) The Psychology of Goals, 2009, pp. 98-126.

Branavan et al., "Reinforcement Learning for Mapping Instructions to Actions," in Proceedings of the Joint Conference of the 47th Annual Meeting of the ACL and the 4th International Joint Conference on Natural Language Processing of the (AFNLP), Suntec, Singapore, Aug. 2-7, 2009, pp. 82-90.

Chang et al., "Matterport3D: Learning From RGB-D Data in Indoor Environments," International Conference on 3D Vision (3DV), Quingdao, China, Oct. 10-12, 2017, pp. 667-676.

Chatham et al., "Cognitive Control Reflects Context Monitoring, Not Motoric Stopping, in Response Inhibition," PloS One, vol. 7, Issue 2, Feb. 2012. pp. 1-13.

Cohn et al., "Incorporating Structural Alignment Biases Into an Attentional Neural Translation Model," in Proceedings of North American Chapter of the Association for Computational Linguistics (NAACL), San Diego, California, USA, Jun. 12-17, 2016, pp. 876-885.

Das et al., "Visual Dialog," In Proceedings of the IEEE Conference on Computer Vision and Pattern Recognition (CVPR.), Honolulu, Hawaii, USA, Jul. 21-26, 2017. pp. 326-335.

Das et al., "Embodied Question Answering," in Proceedings of the IEEE Conference on Computer Vision and Pattern Recognition (CVPR), Salt Lake City, Utah, USA, Jun. 18-22, 2018, pp. 1-10.

De Vries et al., "Talk the Walk: Navigating New York City Through Grounded Dialogue," Jul. 13, 2018. 22 pages. arXiv:1807.03367.

(56) References Cited

OTHER PUBLICATIONS

Fried et al., "Speaker-Follower Models for Vision-and-Language Navigation," in 32nd Conference on Neural Information Processing Systems (NIPS), Montreal, Canada, Dec. 2-8, 2018, 12 pages.
Gavrilyuk et al., "Actor and Action Video Segmentation From a Sentence," in Proceedings of the IEEE Conference on Computer Vision and Pattern Recognition (CVPR), Salt Lake City, Utah, USA, Jun. 18-22, 2018, pp. 5958-5966.
Gordon et al., "IQA: Visual Question Answering in Interactive Environments," in Proceedings of the IEEE Conference on Computer Vision and Pattern Recognition (CVPR), Salt Lake City, Utah, USA, Jun. 18-22, 2018 pp. 4089-4098.
Hu et al., "Natural language object retrieval," in Proceedings of the IEEE Conference on Computer Vision and Parten1 Recognition (CYPR), Las Vegas, Nevada, USA, Jun. 26-Jul. 1, 2016, pp. 4555-4564.
Kempka et al., "ViZDoom: A Doom-based AI Research Platform for Visual Reinforced Learning," Proceedings of IEEE Conference of Computational Intelligence in Games 2016, Sep. 20-23, 2016, pp. 1-8.
Lu et al., "Visual Relationship Detection with Language Priors," in the 14th European Conference on Computer Vision (ECCV), Amsterdam, The Netherlands, Oct. 11-14, 2016, pp. 852-869.
Lu et al., "Hierarchical Question Image Co-Attention for Visual Question Answering," 30th Conference on Neural Information Processing Systems (NIPS). Barcelona, Spain. Jan. 1, 2016. pp. 1-9.
Lu et al., "Neural baby talk," in Proceedings of the IEEE Conference on Computer Vision and Pattern Recognition (CVPR), Salt Lake City, Utah, USA, Jun. 18-22, 2018, pp. 7219-7228.
Ma et al., "Attend and Interact: Higher-Order Object Interactions for Video Understanding," in Proceedings of the IEEE Conference on Computer Vision and Pattern Recognition (CVPR), Salt Lake City, Utah, USA, Jun. 18-22, 2018, pp. 6790-6800.
MacMahon et al., "Walk the Talk: Connecting Language, Knowledge and Action In Route Instructions," in Proceedings of the Twenty-First National Conference on Artificial Intelligence and the Eighteenth Innovative Applications of Artificial Intelligence Conference (AAAI), Boston, Massachusetts, USA, Jul. 16-20, 2006, pp. 1475-1482.
Mei et al., "Listen, Attend, And Walk: Neural Mapping of Navigational Instructions to Action Sequences," Proceedings of the Thirtieth Conference on Artificial Intelligence (AAAI), Phoenix, Arizona, USA, Feb. 12-17, 2016, pp. 2772-2778.
Mirowski et al., "Learning to Navigate in Complex Environments," in International Conference on Learning Representations (ICLR), Toulon, France, Apr. 24-26, 2017, pp. 1-9.
Misra, et al., "Mapping Instructions and Visual Observations to Actions With Reinforcement Learning," in Proceedings of the Conference on Empirical Methods in Natural Language Processing (EMNLP), Copenhagen, Denmark, Sep. 7-11, 2017, pp. 1004-1015.
Misra, et al., "Tell Me Dave: Context-Sensitive Grounding of Natural Language to Manipulation Instructions," The International Journal of Robotics Research, vol. 35, 2016, pp. 281-300.
Mousavian et al., "Visual Representations for Semantic Target Driven Navigation," May 15, 2018, 18 pages. arXiv:1805.06066.
Nagaraja et al., "Modeling Context Between Objects for Referring Expression Understanding," in European Conference on Computer Vision (ECCV), Amsterdam, Netherlands, Oct. 8-16, 2016, pp. 792-807. Springer Publishing (DOI: 10.1007/978-3-319-46493-0_48).
Rohrbach et al., "Grounding of Textual Phrases in Images by Reconstruction," in European Conference on Computer Vision (ECCV), Amsterdam, Netherlands, Oct. 8-16, 2016, pp. 817-834. Springer Publishing (DOI: 10.1007/978-3-319-46448-0_49).
Tapaswi et al., "Movieqa: Understanding Stories in Movies Through Question-Answering," in Proceedings of the IEEE Conference on Computer Vision and Pattern Recognition (CVPR), Las Vegas, Nevada, Jun. 26-Jul. 1, 2016, pp. 4631-4640.
Tellex et al., "Understanding Natural Language Commands for Robotic Navigation and Mobile Manipulation," in Proceedings of the Twenty-Fifth Conference on Artificial Intelligence (AAAI), San Francisco, California, USA, Aug. 7-11, 2011, pp. 1507-1514.
Vaswani et al., "Attention is All You Need," 31st Conference on Neural Information Processing Systems (NIPS 2017). Long Beach, CA. Dec. 4-9, 2017. pp. 1-15.
Vogel et al., "Learning to Follow Navigational Directions," in Proceedings of the 48th Annual Meeting of the Association for Computational Linguistics (ACL), Upsala, Sweden, Jul. 11-16, 2010, pp. 806-814.
Wang et al., "Omnidirectional CNN for Visual Place Recognition and Navigation," in Proceedings of the IEEE Conference on Robotics and Automation (ICRA), Brisbane, QLD, Australia, May 21-25, 2018. pp. 2341-2348.
Wang et al., "Look Before You Leap: Bridging Model-Free and Model-Based Reinforcement Learning for Planned-Ahead Vision-and-Language Navigation," in 5th European Conference on Computer Vision (ECCV), Munich, Germany, Sep. 8-14, 2018, pp. 38-55. Springer International Publishing: (https://www.doi.org/10.1007/978-3-030-01270-0_3).
Wayne et al., "Unsupervised Predictive Memory in a Goal-Directed Agent," Mar. 28, 2018, 57 pages. arXiv:1803.10760.
Xia et al., "Gibson Env: Real-World Perception for Embodied Agents," in Proceedings of the IEEE Conference on Computer Vision and Pattern Recognition (CVPR), Salt Lake City, Utah, USA, Jun. 19-21, 2018, pp. 9068-9079.
Yu et al., "Guided Feature Transformation (GFT): A Neural Language Grounding Module for Embodied Agents," in 2nd Annual Conference on Robot Learning (CoRL), Zurich, Switzerland, Oct. 29-31, 2018, pp. 81-98.
Zhou et al., "Towards Automatic Learning of Procedures From Web Instructional videos," in The Thirty-Second AAAI Conference on Artificial Intelligence (AAAI), New Orleans, Louisiana, USA, Feb. 2-7, 2018, pp. 7590-7598.
Zhou et al., "End-To-End Dense Video Captioning with Masked Transformer," in Proceedings of the IEEE Conference on Computer Vision and Pattern Recognition (CVPR), Salt Lake City, Utah, USA, Jun. 18-22, 2018. pp. 8739-8748.
Zhu et al., "Visual Semantic Planning using Deep Successor Representations," in Proceedings of the IEEE International Conference on Computer Vision (ICCV), Venice, Italy, Oct. 22-29, 2017, pp. 483-492.
Zhu et al., "Target-Driven Visual Navigation In Indoor Scenes Using Deep Reinforcement Learning," in Proceedings of the IEEE International Conference on Robotics and Automation (ICRA), Singapore, May 29-Jun. 3, 2017, pp. 3357-3364.
International Preliminary Report on Patentability received for PCT Patent Application No. PCT/US19/053200, dated Apr. 8, 2021, 8 pages.
Otawara et al., "Grounding of natural language to the real environment to achieve interactive operation of autonomous driving", Robotics Society of Japan, 36th Academic Lecture, THT 36th Annual Conference of the Robotics Society of Japan, Sep. 4, 2018,, 5 pages.

* cited by examiner

| Method | Validation-Seen | | | Validation-Unseen | | | Test (unseen) | | |
|---|---|---|---|---|---|---|---|---|---|
| | NE ↓ | SR ↑ | OSR ↑ | NE ↓ | SR ↑ | OSR ↑ | NE ↓ | SR ↑ | OSR ↑ |
| Random | 9.45 | 0.16 | 0.21 | 9.23 | 0.16 | 0.22 | 9.77 | 0.13 | 0.18 |
| Student-forcing | 6.01 | 0.39 | 0.53 | 7.81 | 0.22 | 0.28 | 7.85 | 0.20 | 0.27 |
| RPA | 5.56 | 0.43 | 0.53 | 7.65 | 0.25 | 0.32 | 7.53 | 0.25 | 0.33 |
| Speaker-Follower | 3.88 | 0.63 | 0.71 | 5.24 | 0.50 | 0.63 | - | - | - |
| Speaker-Follower (with data augmentation) | 3.08 | 0.70 | 0.78 | 4.83 | 0.55 | 0.65 | 4.87 | 0.53 | 0.64 |
| Ours | 3.23 | 0.70 | 0.78 | 5.04 | 0.57 | 0.70 | 4.99 | 0.57 | 0.68 |
| Ours (with data augmentation) | 3.04 | 0.71 | 0.78 | 4.62 | 0.58 | 0.68 | 4.47 | 0.61 | 0.70 |

FIG. 5

| | # | Co-Grounding | Progress Monitor | Data Augmentation | Validation-Seen | | | Validation-Unseen | | |
|---|---|---|---|---|---|---|---|---|---|---|
| | | | | | NE ↓ | SR ↑ | OSR ↑ | NE ↓ | SR ↑ | OSR ↑ |
| Baseline* | | | | | 4.36 | 0.54 | 0.68 | 7.22 | 0.27 | 0.39 |
| Ours | 1 | ✓ | | | 3.65 | 0.65 | 0.75 | 6.07 | 0.42 | 0.57 |
| | 2 | ✓ | ✓ | | 3.23 | 0.70 | 0.78 | 5.04 | 0.57 | 0.70 |
| | 3 | ✓ | ✓ | ✓ | 3.04 | 0.71 | 0.78 | 4.62 | 0.58 | 0.68 |

SELF-AWARE VISUAL-TEXTUAL CO-GROUNDED NAVIGATION AGENT

RELATED APPLICATIONS

This application is a continuation of and claims priority to U.S. Non-Provisional application Ser. No. 16/176,955, filed Oct. 31, 2018, which in turn claims priority to U.S. Provisional Application No. 62/737,684, filed Sep. 27, 2018, both of which are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to automated navigation systems, and more specifically to a self-aware visual-textual co-grounded navigation agent.

BACKGROUND

A Vision-and-Language Navigation (VLN) task entails a robot or other mobile automated system following navigational instruction in an unknown environment. In the VLN task, an agent is placed in an unknown realistic environment and is required to follow natural language instructions to navigate the mobile automated system from its starting location to a goal location. In contrast to other navigation situations, a technical problem with a VLN task is that the agent does not have an explicit representation of the target (e.g., location in a map or image representation of the goal) to know if the goal has been reached or not. Instead, the agent needs to be aware of its navigation status through the association between the sequence of observed visual inputs to instructions.

BRIEF DESCRIPTION OF THE DRAWINGS

FIG. 5 illustrates an example table comparing performance of the navigation agent against other approaches.

FIG. 6 illustrates an example table for an ablation study.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Computing Device

Figure 1:
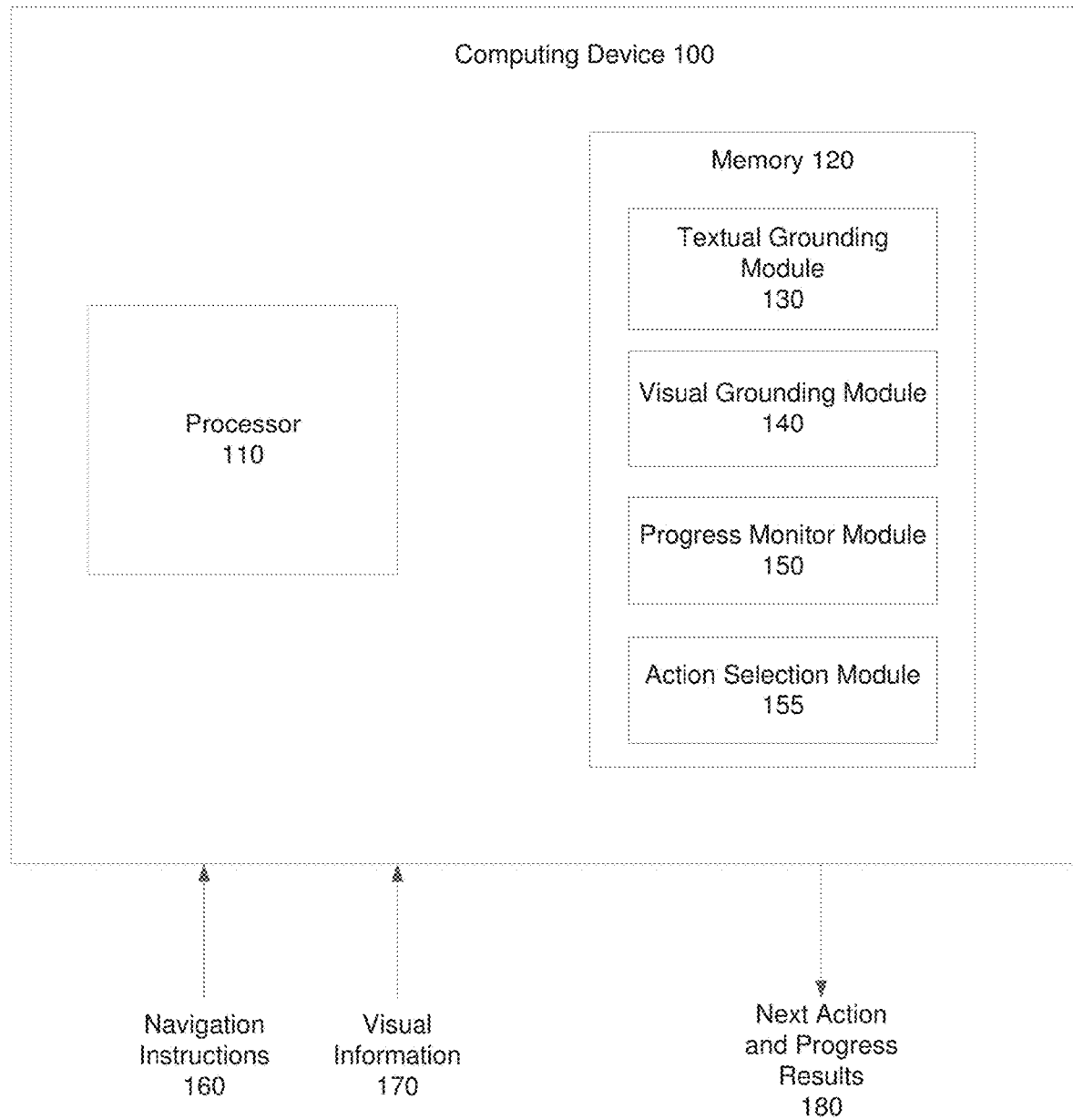
FIG. 1 is a simplified diagram of a computing device according to some embodiments.

FIG. 1 is a simplified diagram of a computing device 100 according to some embodiments. According to some embodiments, computing device 100 may be used to implement an agent that can provide computer instructions to a robot or other mobile automated system for navigating in an unknown environment. In some embodiments, computing device 100 may be incorporated into the robot or automated system. In some embodiments, the computing device may be separate from the robot or automated system, but in communication with the same, for example, over wireless signaling, to exchange data, information, and control.

The computing device 100 can receive instructions 160 for instructing the robot or automated system to navigate in its current environment. An example of such instructions can be: "Exit the bedroom and go towards to the table. Go to the stairs on the left of the couch. Wait on the third step." These instructions can be in the in the form of text or speech provided, for example, by a human user. The computing device 100 can also receive visual information 170, for example, in the form of images captured by a camera in the robot or mobile automated system. The computing device 100 processes both the navigation instructions 160 and visual information 170, and generates next action and progress results 180 for controlling the robot or mobile automated system.

According to some embodiments, the computing device 100 implements or participates in the implementation of a Vision-and-Language (VLN) navigation task, which requires the agent to follow natural language instructions to navigate through a photo-realistic environment without a map. In the VLN task, an agent is placed in an unknown realistic environment and is required to follow natural language instructions to navigate from its starting location to a goal location. Different from existing navigation tasks, the agent does not have an explicit representation of the target (e.g., location in a map or image representation of the goal) to know if the goal has been reached or not.

As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

Figure 3:
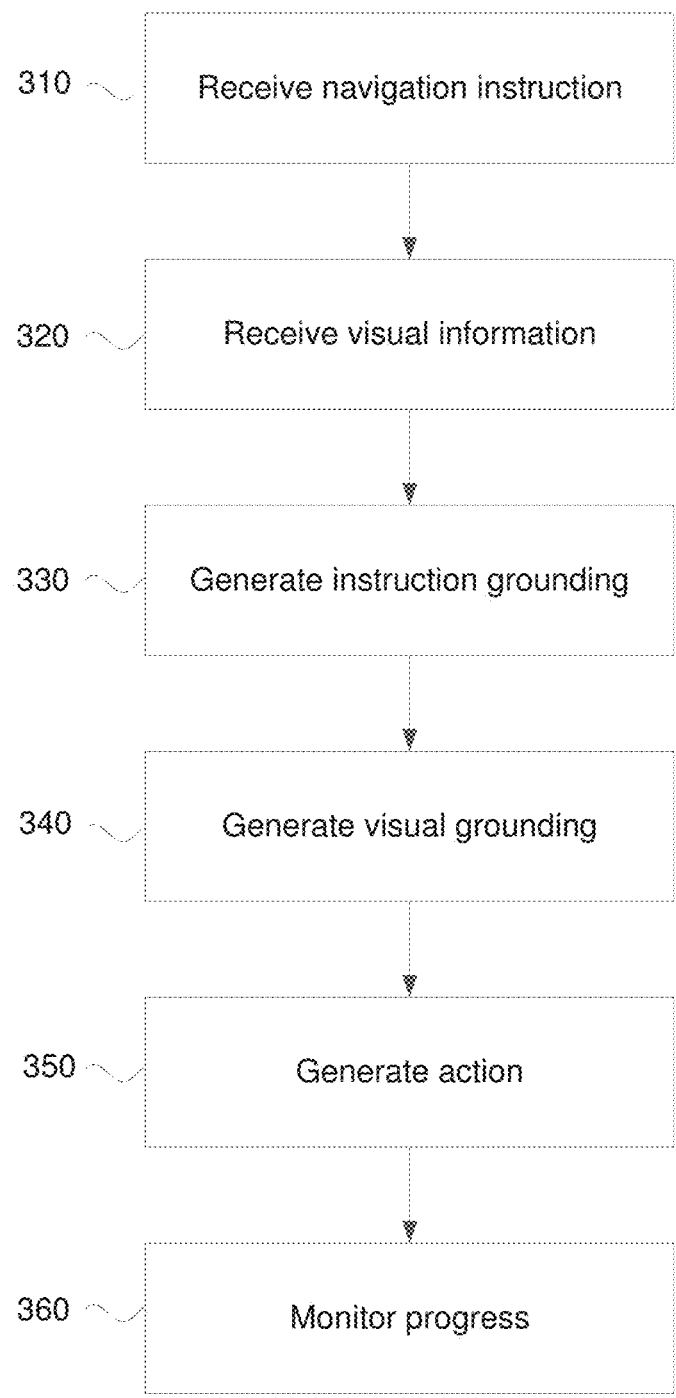
FIG. 3 is a simplified diagram of a method for navigation according to some embodiments.

Referring again to the example, FIG. 3 illustrates the Vision-and-Language (VLN) navigation task for the instructions "Exit the bedroom and go towards the table. Go to the stairs on the left of the couch. Wait on the third step." Given this instruction, in some embodiments, the navigation agent of the present disclosure first needs to locate which instruction is needed for the next movement, which in turn requires the agent to be aware of (e.g., to explicitly represent or have an attentional focus on) which instructions were completed or are ongoing. For instance, the action "Go to the stairs" should be carried out once the agent has exited the room and moved towards the table. However, there exists inherent ambiguity for the action "go towards the table." That is, while the agent is expected to control or direct the robot or mobile automated system to perform the action of "Go to the stairs" after completing the action of "go towards the table," it is not clear what defines the completion of "go towards the table." Therefore, it is necessary for the agent to be aware of both the past and the next part of the instructions to follow them smoothly. Indeed, assessing the progress made towards the goal has been shown to be important for goal-directed tasks in human decision-making. While a number of approaches have been proposed for VLN, previous approaches for VLN generally are not aware of which instruction is next nor the progress towards the goal.

To address this, according to some embodiments, the navigation agent implemented by computing device 100 is provided or equipped with self-awareness, which provides or supports the following abilities: (1) identifying which direction to go or proceed by determining the part of the instruction that corresponds to the observed images—visual grounding, (2) identifying which part of the instruction has been completed or ongoing and which part is potentially needed for the next action selection—textual grounding, and (3) ensuring that the grounded instruction can correctly be used to estimate the progress made towards the goal, and apply regularization to ensure this—progress monitoring.

In some embodiments, both visual and textual grounding are achieved simultaneously by incorporating the full history of grounded instructions (e.g., based on or derived from navigation instructions 160), observed images (e.g., visual information 170), and selected actions into the navigation agent. The navigation agent leverages the structural bias between the words in the instructions used for action selection and the progress made towards the goal. A new objective function for the agent is proposed or provided to measure how well the agent can estimate the completion of instruction-following. By conditioning on the positions and weights of grounded instruction as input, the navigation agent can be self-aware of its progress and further ensure that the textual grounding accurately reflects the progress made.

To implement this, in some embodiments, as shown in FIG. 1, memory 120 includes a textual grounding module 130, a visual grounding module 140, a progress monitor module 150, and an action selection module 155. In some embodiments, any, up to all, of textual grounding module 130, visual grounding module 140, progress monitor module 150, and action selection module 155 may include or be implemented with a single- or multi-layer neural network, with suitable pre-processing, encoding, decoding, and output layers. Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make.

In some embodiments, the agent—implemented with textual grounding module 130, visual grounding module 140, progress monitor module 150, and action selection module 155—is modeled with sequence-to-sequence architecture with attention by using one or more recurrent neural networks (RNNs). In some embodiments, the RNN can use or be implemented with Long Short Term Memory (LSTM) to effectively carry the flow of information.

And although textual grounding module 130, visual grounding module 140, progress monitor module 150, and action selection module 155 are depicted as software modules, they may be implemented using hardware, software, and/or a combination of hardware and software.

Figure 2:
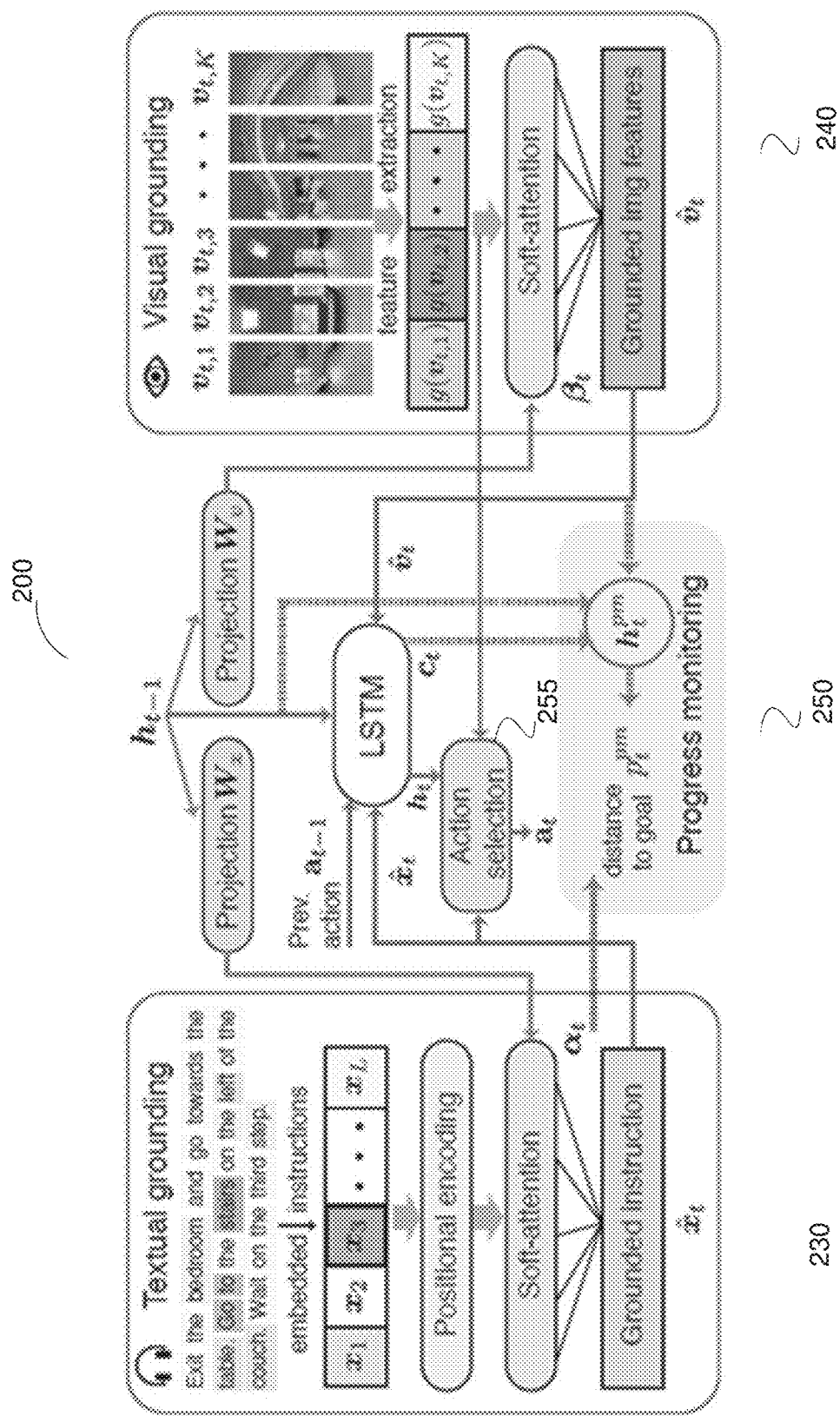
FIG. 2 is a simplified diagram of a navigation agent according to some embodiments.

While FIG. 1 is a high-level diagram, FIG. 2 illustrates more details for the co-grounded navigation agent according to some embodiments. And FIG. 3 shows a corresponding method 300 for the co-grounded navigation agent according to some embodiments. Although FIG. 3 suggests an ordering to processes 310-360, it is understood that the processes may be performed in other orders. For example, in some embodiments, processes 330 and 340 may be performed in any order and/or concurrently.

Navigation Agent

FIG. 2 is a simplified diagram of a navigation agent 200 according to some embodiments. In some embodiments, the navigation agent 200 can implement the navigation agent of the computing device 100 described with respect to FIG. 1.

As shown, the navigation agent 200 comprises textual grounding module 230, visual grounding module 240, progress monitor module 250, and action selection module 255 which in some embodiments, can be implementations for the textual grounding module 130, visual grounding module 140, progress monitor module 150, and action selection module 155 of FIG. 1.

In some embodiments, navigation agent 200 may comprise one or more neural networks, which can implement one or more of the textual grounding module 230, visual grounding module 240, progress monitor module 250, and action selection module 255, or be in addition to, or separate from those modules. The one or more neural networks implement or operate as encoder and decoder to process the various information and other items received by, and generated within, the navigation agent 200. This includes, but is not limited to, the navigation instructions, observed images (e.g., visual information), and information for actions taken by the robot or mobile automated system.

In some embodiments, the navigation agent 200 performs co-grounding on visual and textual signals or information for the VLN task—visual grounding from instructions helps the agent 200 to determine the right direction, whereas textual grounding implicitly enables the navigation agent 200 to know which part of the instruction is completed and which is needed to proceed. Co-grounding provides useful information for the navigation agent 200 to be self-aware, continually monitoring its progress toward a desired goal—e.g., such as the completion of the set of navigations instructions for the robot or mobile automated system.

In some embodiments, the navigation agent 200 is modeled with a sequence-to-sequence architecture with attention by using a recurrent neural network (RNN). In some embodiments, as shown in FIG. 2, such RNN is implemented with one or more encoding elements, which separately or take together implement a Long Short Term Memory (LSTM) 260 to carry the flow of information effectively. The LSTM 260 receives operates or processes (e.g., decodes) information or elements from, among other things, the textual grounding module 230 and the visual grounding module 240. In some embodiments, the navigation agent 200 is enabled with panoramic view (for example, as described in more detail in Fried et al., "Speaker-follower models for vision-and-language navigation," In *Advances in Neural Information Processing Systems* (*NIPS*), 2018, which is incorporated by reference herein).

With respect to notation, given a natural language instruction (e.g., 160) with L words, its representation is denoted by $X=\{x_1, x_2, \ldots, x_L\}$, where $x_l$ is the feature vector for the l-th word encoded by an LSTM language encoder. At each time step t, the navigation agent 200 perceives a set of images at each viewpoint $v_t=\{v_{t,1}, v_{t,2}, \ldots, v_{t,K}\}$, where K is the maximum number of navigable directions, and $v_{t,k}$ represents the image feature of direction k. The co-grounding feature of instruction and image are denoted as $\hat{x}_t$ and $\hat{v}_t$ respectively. The selected action is denoted as $a_t$. The learnable weights are denoted with W, with appropriate sub/super-scripts as necessary. In some embodiments, the bias term b can be omitted to avoid notational clutter in the exposition.

At each time step t, the LSTM 260 (decoder) observes representations of the current attended panoramic image or visual grounding feature $\hat{v}_t$, previous selected action $a_{t-1}$ and current grounded instruction feature $\hat{x}_t$ as input, and outputs an encoder context or hidden state $h_t$:

$$h_t = \text{LSTM}([\hat{x}_t, \hat{v}_t, a_{t-1}]) \quad (1)$$

where [,] denotes concatenation. The previous encoder context $h_{t-1}$ is used to obtain the textual grounding feature $\hat{x}_t$ and visual grounding feature $\hat{v}_t$, whereas the current encoder context $h_t$ can be used to obtain next action $a_t$, as described herein.

Navigation agent 200 receives as input navigation instructions (process 310 of FIG. 3)—e.g., "Exit the bedroom and go towards to the table. Go to the stairs on the left of the couch. Wait on the third step." In particular, the textual grounding module 230 receives and operates on the navigation instructions. When the agent 200 moves from one viewpoint to another, it is required to identify which direction to go by relying on grounded instruction, i.e., which parts of the instruction should be used. This can either be the instruction matched with the past (ongoing action $a_{t-1}$) or predicted for the future (next action $a_t$). In some embodiments, the textual grounding module 230 performs natural language processing (NLP) on the instructions 160. NLP is one class of problems to which neural networks may be applied. NLP can be used to instill new neural networks with an understanding of individual words and phrases.

Based on the received navigation instructions, textual grounding module 230 generates an instruction grounding (process 330 of FIG. 3). Textual grounding module 230 identifies which part of an instruction has been completed or ongoing and which part is outstanding, and thus potentially needed for the next action. To capture the relative position between words within an instruction, in some embodiments, textual grounding module 230 performs or incorporates positional encoding PE(.) (as described in more detail, for example, in Vaswani et al., "Attention is all you need," In *Advances in Neural Information Processing Systems* (*NIPS*), pp. 5998-6008, 2017, which is incorporated by reference herein) into the instruction features. Textual grounding module 230 then performs soft-attention (e.g., softmax) on the instruction features X, as shown on the left side of FIG. 2. The attention distribution over L words of the instructions is computed as:

$$z_{t,l}^{textual}=(W_x h_{t-1})^T \text{PE}(x_l), \text{ and } \alpha_t=\text{softmax}(z_t^{textual}), \quad (2)$$

where $W_x$ are parameters to be learned, $z_{t,l}^{textual}$ is a scalar value computed as the correlation between word l of the instruction and previous hidden state $h_{t-1}$, and $\alpha_t$ is the attention weight over features in instructions X at time t. Based on the textual attention distribution, the grounded textual feature $\hat{x}_t$ can be obtained by the weighted sum over the textual features $\hat{x}_t = \alpha^T X$.

In some embodiments, the embedding dimension for encoding the navigation instruction is 256. The navigation agent can use a dropout layer with ratio 0.5 after the embedding layer. The instruction can be encoded using a regular LSTM, and the hidden state is 512 dimensional. The MLP g used for projecting the raw image feature is BN→FC→BN→Dropout→ReLU. The FC layer projects the 2176-d input vector to a 1024-d vector, and the dropout ratio is set to be 0.5. The hidden state of the LSTM used for carrying the textual and visual information through time in Eq. 1 is 512. The maximum length of instruction is set to be 80, thus the dimension of the attention weights of textual grounding $\alpha_t$ is also 80. The dimension of the learnable matrices from Eq. 2 to 5 are: $W_x \in R^{512 \times 512}$, $W_v \in R^{512 \times 1024}$, $W_a \in R^{1024 \times 1024}$, $W_h \in R^{1536 \times 512}$, and $W_h \in R^{592 \times 1}$.

In order to locate the completed or ongoing instruction, the navigation agent 200 should keep track of the sequence of images observed along the navigation trajectory. To accomplish this, the navigation agent 200 receives visual information (process 320 of FIG. 3). The visual grounding module 240 operates on the visual information $v_t$, which can be in the form of one or more images from a camera, e.g., provided on the robot or automated system. The visual grounding module 240 generates visual grounding (process 340 of FIG. 3). To make a decision on which direction to go, the navigation agent 200, using visual grounding module 240, finds the image features on navigable directions with the highest correlation with the grounded navigation instruction.

In some embodiments, visual grounding module 240 can use the pre-trained ResNet-152 on ImageNet to extract image features. Each image feature is thus a 2048-d vector. The embedded feature vector for each navigable direction is obtained by concatenating an appearance feature with a 4-d orientation feature [sin $\phi$; cos $\phi$; sin $\theta$; cos $\theta$], where $\phi$ and $\theta$ are the heading and elevation angles. The 4-dim orientation features are tiled 32 times (as described in more detail in Fried et al., 2018), resulting in an embedding feature vector with 2176 dimension.

In some embodiments, visual grounding module 240 performs visual attention over the surrounding views based on its previous hidden vector $h_{t-1}$. The visual attention weight $\beta_t$ can be obtained as:

$$z_{t,k}^{visual}=(W_v h_{t-1})^T g(v_{t,k}), \text{ and } \beta_t=\text{softmax}(z_t^{visual}), \quad (3)$$

where g is a two-layer Multi-Layer Perceptron (MLP), $W_v$ are parameters to be learnt. Similar to Eq. 2, the grounded visual feature $\hat{v}_t$ can be obtained by the weighted sum over the visual features $\hat{v}_t=\beta_t^T v$.

Navigation agent 200 generates an action for navigation (process 350 of FIG. 3). In particular, action selection module 255 identifies, determines, generates, or selects an action $a_t$ for the robot or automated system to take (e.g., which direction to go). To make a decision on the action, in some embodiments, the action selection module 255 identifies or finds the image features on navigable directions with the highest correlation with the grounded navigation instruction $\hat{x}_t$ and the current hidden state $h_t$. In some embodiments, the action selection module 255 uses the inner-product to compute the correlation, and the probability of each navigable direction is then computed as:

$$o_{t,k}=(W_a[h_t, \hat{x}_t])^T g(v_{t,k}) \text{ and } p_t=\text{softmax}(o_t), \quad (4)$$

where $W_a$ are the learned parameters, g(.) is the same Multi-Layer Perceptron (MLP) as in Eq. 3, and $p_t$ is the probability of each navigable direction at time t. The action selection module 255 uses categorical sampling during training to select the next action $a_t$.

Unlike other methods with the panoramic view, which attend to instructions only based on the history of observed images, the navigation agent 200 achieves both textual and visual grounding using the shared hidden state output containing, derived, or based on grounded information from both textual and visual modalities. In some embodiments, during action selection, action selection module 255 relies on both hidden state output and grounded instruction, instead of only relying on grounded instruction.

According to some embodiments, one or both of LSTM 260 and action selection module 255 taken together with the textual grounding module 230 and the visual grounding module 240 support, allow for, or provide visual-textual co-grounding to identify or determine the navigation instruction completed in the past, the navigation instruction needed in the next action, and the moving direction from surrounding images. As such, such combination of these elements can form a visual-textual co-grounding module.

In some embodiments, the textual-grounding should correctly or accurately reflect the progress (e.g., that the robot or mobile automated system is making) towards the goal, since the navigation agent 200 can then implicitly know where it is now and what the next instruction to be completed will be. With the visual-textual co-grounding, navigation agent 200 can ensure that the grounded instruction reasonably informs decision making when selecting a navigable direction. This may be necessary, but not sufficient, for ensuring that the notion of progress to the goal is encoded.

Thus, according to some embodiments, the navigation agent 200 may monitor the progress of the robot or mobile automated system towards its goal (process 360 of FIG. 3). For this, navigation agent 200 may include or incorporate a progress monitor module 250. The progress monitor module 250 can serve as regularizer during training and intelligently prunes unfinished trajectories during inference.

Since the positions of localized instruction can be a strong indication of the navigation progress due to the structural alignment bias between navigation steps and instruction, the progress monitor module 250 can estimate how close the current viewpoint is to the final goal by conditioning on the positions and weights of grounded instruction. This can further enforce the result of textual-grounding to align with the progress made towards the goal and to ensure the correctness of the textual-grounding.

In some embodiments, the progress monitor module 250 aims to estimate the navigation progress by conditioning on three inputs: the history of grounded images and instructions, the current observation of the surrounding images, and the positions of grounded instructions. We therefore represent these inputs by using (1) the previous hidden state $h_{t-1}$ and the current cell state $c_t$ of the LSTM 260, (2) the grounded surrounding images $\hat{v}_t$, and (3) the distribution of attention weights of textual-grounding $\alpha_t$, as shown at the bottom of FIG. 2. For this, the progress monitor module 250 receives input from each of the textual grounding module 230 and visual grounding module 240.

In some embodiments, the progress monitor module 250 first computes an additional hidden state output $h_t^{pm}$ by using grounded image representations $\hat{v}_t$ as input, similar to how a regular LSTM computes hidden states except it uses concatenation over element-wise addition for empirical reasons. The hidden state output is then concatenated with the attention weights $\alpha_t$ on textual-grounding to estimate how close the navigation agent 200 is to the goal. The output of the progress monitor $p_t^{pm}$, which represents the completeness of instruction-following, is computed as:

$$h_t^{pm}=\sigma(W_h([h_{t-1}, \hat{v}_t])\text{ß}\tan h(c_t)), p_t^{pm}=\tan h(W_{pm}([\alpha_t, h_t^{pm}])) \quad (5)$$

where $W_h$ and $W_{pm}$ are the learned parameters, $c_t$ is the cell state of the LSTM 260, ß denotes the element-wise product, and a is the sigmoid function.

Figure 4:
FIG. 4 shows an example of a Vision-and-Language (VLN) navigation task according to some embodiments.

FIG. 4 shows an example of the navigation agent 200 of the present disclosure operating to instruct a robot or mobile automated system to carry out navigation instructions—e.g., "Walk up stairs. At top of stairs turn right. Walk straight to bedroom. Turn left and walk to bed lamp. Turn left and enter closet. Stop at . . . " The self-aware agent 200 successfully navigates in an unseen environment. The agent 200 starts from starting position and follows the instruction towards the goal. The percentage of instruction completeness estimated by the proposed progress monitor gradually increases as the agent 200 navigates and approaches to the desired goal.

Training

According to some embodiments, a new objective function is used to train the progress monitor module 250. The training target $y_t^{pm}$ is defined as the normalized distance from the current viewpoint to the goal, i.e., the target will be 0 at the beginning and closer to 1 as the navigation agent 200 approaches the goal. Note that the target can also be lower than 0, if the navigation agent's current distance from the goal is farther than the starting point. Finally, the self-aware agent 200 is optimized with two cross-entropy losses, computed with respect to the outputs from both action selection and progress monitor.

$$\mathcal{L}_{loss} = -\lambda \underbrace{\sum_{t=1}^{T} y_t^{nv} \log(p_{k,t})}_{\text{action selection}} - (1-\lambda) \underbrace{\sum_{t=1}^{T} y_t^{pm} \log(p_t^{pm})}_{\text{progress monitor}} \quad (6)$$

where $p_{k,t}$ is the action probability of each navigable direction, $\lambda=0.5$ is the weight balancing the two losses, and $y_t^{nv}$ is the ground-truth navigable direction at step t.

In some embodiments, use ADAM can be used as the optimizer during training. The learning rate is 1e−4 with batch size of 64 consistently throughout all experiments. When using beam search, the beam size is set to be 15. Categorical sampling can be performed during training for action selection.

Inference

In some embodiments, during inference, the navigation agent 200 can use or employ beam search (as described in more detail in Fried et al., 2018). In particular, while the navigation agent 200 decides which trajectories in the beams to keep, it is equally important to evaluate the state of the beams on actions as well as on the agent's confidence in completing the given instruction at each traversed viewpoint. This is accomplished by integrating the output of progress monitor module 250 into the accumulated probability of beam search. At each step, when candidate trajectories compete based on accumulated probability, the estimated completeness of instruction-following $p_t^{pm}$ is integrated with action probability $p_{k,t}$ to directly evaluate the partial and unfinished candidate routes: $p_t^{beam}=p_t^{pm} \times P_{k,t}$

Experiments and Evaluation

In some embodiments, the navigation agent 200 can be evaluated using the Room-to-Room (R2R) dataset, as further described in more detail in Anderson et al., "Vision-and-language navigation: Interpreting visually-grounded navigation instructions in real environments," In *Proceedings of the IEEE Conference on Computer Vision and Pattern Recognition (CVPR)*, volume 2, 2018, which is incorporated by reference. The R2R dataset has 7,189 paths, with each path having three ground-truth navigation instructions written by humans. The whole dataset is divided into 4 sets: training, validation seen, validation unseen, and test sets unseen.

For evaluation, the same metrics used by previous work on the R2R task are followed: (1) Navigation Error (NE), mean of the shortest path distance in meters between the navigation agent's final position and the goal location; (2) Success Rate (SR), the percentage of final positions less than 3 m away from the goal location; and (3) Oracle Success Rate (OSR), the success rate if the navigation agent can stop at the closest point to the goal along its trajectory.

The self-aware navigation agent 200 of the present disclosure is compared with various existing approaches—e.g., Student-forcing (Anderson et al., 2018), RPA (Wang et al., "Look before you leap: Bridging model-free and model-based reinforcement learning for planned-ahead vision-and-language navigation," In *European Conference on Computer Vision (ECCV)*, 2018), and Speaker-Follower (Fried et al., 2018). As shown in the table of FIG. 5, the navigation agent 200 of the present disclosure (and its corresponding method) achieve significant performance improvement compared to the state of the art without data augmentation. The agent 200 achieves 70% SR on the seen environment and 57% on the unseen environment while the best performing existing method achieved 63% and 50% SR, respectively. When trained with synthetic data2, the agent and method of the present disclosure achieve slightly better performance on the seen environments and significantly better performance on both the validation unseen environments and the test unseen environments when submitted to the test server. The agent and method of the present disclosure achieve 3% and 8% improvement on SR on both validation and test unseen environments. Both results with or without data augmentation indicate that agent and method of the present disclosure are more generalizable to unseen environments.

Textually grounded agent. Intuitively, an instruction-following agent is required to strongly demonstrate the ability to correctly focus and follow the corresponding part of the instruction as it navigates through an environment. Thus, in some embodiments, the distribution of attention weights on instruction are recorded at each step as indications of which parts of the instruction are being used for action selection. All runs are averaged across both validation seen and unseen dataset splits. It is expected that the distribution of attention weights lies close to a diagonal, where at the beginning, the agent 200 focuses on the beginning of the instruction and shifts its attention towards the end of instruction as it moves closer to the goal.

To demonstrate, the method with panoramic action space (proposed in Fried et al., 2018) is used as a baseline for comparison. The self-aware navigation agent 200 with progress monitor demonstrates that the positions of grounded instruction over time form a line similar to a diagonal. This result may further indicate that the agent successfully utilizes the attention on instruction to complete the task sequentially. Both the baseline approach and the navigation agent 200 of the present disclosure were able to focus on the first part of the instruction at the beginning of navigation consistently. However, as the agents move further in unknown environments, the self-aware agent 200 can still successfully identify the parts of instruction that are potentially useful for action selection, whereas the baseline approach becomes uncertain about which part of the instruction should be used for selecting an action.

Ablation Study

FIG. 6 illustrates an example table for an ablation study. In particular, this table shows the effect of each component of the navigation agent 200—co-grounded, progress monitoring, and data augmentation—compared to the existing approaches. All methods use a panoramic action space. The model from with panoramic action space (proposed in Fried et al., 2018) is implemented as a baseline.

Co-grounding. When comparing the baseline approach with row #1 in the navigation agent 200 and method of the present disclosure, it can be seen that the co-grounding agent 200 outperformed the baseline by a large margin. This is due to the fact that the navigation agent 200 uses the LSTM to carry both the textually and visually grounded content, and the decision on each navigable direction is predicted with both textually grounded instruction and the hidden state output of the LSTM. On the other hand, the baseline agent relies on the LSTM to carry visually grounded content, and uses the hidden state output for predicting the textually grounded instruction. As a result, it is observed that instead of predicting the instruction needed for selecting a navigable direction, the textually grounded instruction may match with the past sequence of observed images implicitly saved within the LSTM.

Progress monitor. The output of the progress monitor is integrated with the state-factored beam search (Fried et al., 2018), so that the candidate paths compete not only based on the probability of selecting a certain navigable direction but also on the estimated correspondence between the past trajectory and the instruction. As seen by comparing row #1 with #2 in the table of FIG. 6, the progress monitor significantly improved the success rate on both seen and unseen environments and is the key for surpassing the state of the art even without data augmentation.

Data augmentation. In the above, it is shown that each row in the approach of the present disclosure contributes to the performance. Each of them increases the success rate and reduces the navigation error incrementally. By further combining them with the data augmentation pre-trained from the speaker (Fried et al., 2018), the SR and OSR are further increased, and the NE is also drastically reduced. Interestingly, the performance improvement introduced by data augmentation is smaller than from Speaker-Follower on the validation sets (see Table of FIG. 5 for comparison). This demonstrates that the navigation agent and method of the present disclosure are more data-efficient.

Qualitative Results

Figure 7:
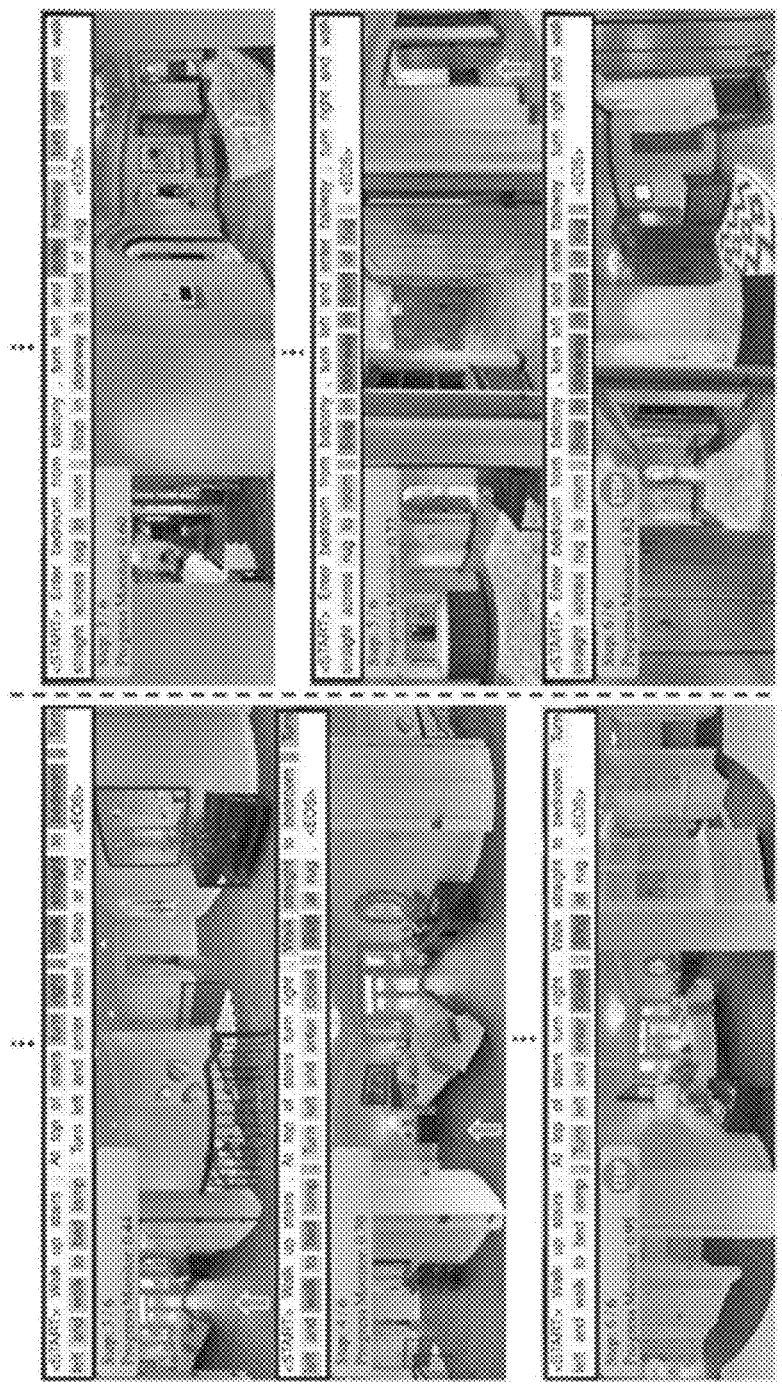
FIG. 7 shows examples of the navigation agent performing navigation tasks.

To further validate the agent and method of the present disclosure, it is qualitatively shown how the agent 200 navigates through unseen environments by following instructions as illustrated in FIG. 7. In each figure, the self-aware agent 200 follows the grounded instruction (at the top of the figure) and decides to move towards a certain direction (arrow).

Consider the trajectory on the left side in FIG. 7, at step 3, the grounded instruction illustrated that the agent 200 just completed "turn right" and focuses mainly on "walk straight to bedroom." As the agent 200 entered the bedroom, it then shifts the textual grounding to the next action "Turn left and walk to bed lamp." Finally, at step 6, the agent 200 completed another "turn left" and successfully stops at the rug. Consider the example on the right side, the agent 200 has already entered the hallway and now turns right to walk across to another room. However, it is ambiguous as to which room the instruction is referring. At step 5, the navigation agent 200 checked out the room on the left first and realized that it does not match with "Stop in doorway in front of rug." It then moves to the next room and successfully stops at the goal.

In both cases illustrated in FIG. 7, it can be seen that the completeness estimated by progress monitor gradually increases as the agent 200 steadily navigates toward the goal.

Thus, a self-aware agent for navigating a mobile automated system is disclosed herein. According to some embodiments, the navigation agent includes two complementary modules: a visual-textual co-grounding module and a progress monitor module. The visual-textual co-grounding module identifies or determines the navigation instruction completed in the past, the navigation instruction needed in the next action, and the moving direction from surrounding images. The progress monitor module regularizes and ensures the grounded instruction correctly or accurately reflects the progress towards the goal by explicitly estimating the completeness of instruction-following. This estimation is conditioned on the positions and weights of grounded instruction. Experiments have shown that this approach sets a new state-of-the-art performance on the standard Room-to-Room dataset on both seen and unseen environments.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computing device of a mobile automated system comprising:
   a memory containing machine readable medium storing machine executable code; and
   one or more processors coupled to the memory and configurable to execute the machine executable code to cause the one or more processors to:
   receive training data comprising one or more training navigation instruction samples;
   generate, by a first attention module, an instruction grounding from the training navigation instruction sample for instructing the mobile automated system to navigate an environment in which the mobile automated system is located;
   generate, by a second attention module, a visual grounding from one or more training images observed for the environment as the mobile automated system is navigating therethrough at the first time instance;
   generate, by a neural model, a progress monitor probability in response to an input of the instruction grounding and the visual grounding;
   generate an action probability of navigation directions based on a hidden state of the neural model and the instruction grounding;

train the neural model based at least in part on a first cross entropy between the progress monitor probability and a target progress label, and a second cross-entropy between the action probability and a ground-truth navigable direction; and generate a navigational action for the mobile automated system to navigate the environment by the trained neural model.

2. The computing device of claim 1, wherein the machine executable code further causes the one or more processors to generate the instruction grounding based at least in part on the training navigation instruction sample, the instruction grounding identifying which part of the training navigation instruction sample has been completed by the mobile automated system and which part of the training navigation instruction sample is outstanding.

3. The computing device of claim 1, wherein the machine executable code further causes the one or more processors to generate the visual grounding based at least in part on the visual information contained in the training images, the visual grounding identifying a direction in which the mobile automated system should proceed.

4. The computing device of claim 1, wherein the ground-truth progress label is computed as a normalized distance from a current viewpoint to a goal.

5. The computing device of claim 1, wherein the loss objective is computed as a linear combination of the first cross-entropy and the second cross-entropy with a weighting parameter adjusting a ratio between the first cross-entropy and the second cross-entropy.

6. The computing device of claim 1, wherein the machine executable code further causes the one or more processors to monitor progress of navigation of the automated system to ensure that the instruction grounding accurately reflects the navigation progress.

7. The computing device of claim 1, wherein the machine executable code causes the one or more processors to:
generate an encoder context based on the instruction grounding and the visual grounding; and
generate the action probability for the mobile automated system using the encoder context.

8. The computing device of claim 1, wherein the machine executable code causes the one or more processors to perform a natural language processing task on the training navigation instruction sample.

9. The computing device of claim 1, wherein the machine executable code causes the one or more processors to identify a navigable direction with the highest correlation to the instruction grounding.

10. The computing device of claim 1, wherein the machine executable code causes the one or more processors to:
identify a plurality of directions in which the mobile automated system can navigate; and
for each identified navigable direction, generate a respective probability.

11. A method of training a neural model at a computing device of a mobile automated system for monitoring navigation progress, the method comprising:
receiving, at the computing device, training data comprising one or more training navigation instruction samples;
generating, by a first attention module, an instruction grounding from the training navigation instruction sample for instructing the mobile automated system to navigate an environment in which the mobile automated system is located;
generating, by a second attention module, a visual grounding from one or more training images observed for the environment as the mobile automated system is navigating therethrough at the first time instance;
generating, by a neural model, a progress monitor probability in response to an input of the instruction grounding and the visual grounding;
generating an action probability of navigation directions based on a hidden state of the neural model and the instruction grounding;
training the neural model based at least in part on a first cross entropy between the progress monitor probability and a target progress label, and a second cross-entropy between the action probability and a ground-truth navigable direction; and
generating a navigational action for the mobile automated system to navigate the environment by the trained neural model.

12. The method of claim 11, further comprising:
generating the instruction grounding based at least in part on the training navigation instruction sample, the instruction grounding identifying which part of the training navigation instruction sample has been completed by the mobile automated system and which part of the training navigation instruction sample is outstanding.

13. The method of claim 11, further comprising:
generating the visual grounding based at least in part on the visual information contained in the training images, the visual grounding identifying a direction in which the mobile automated system should proceed.

14. The method of claim 11, wherein the ground-truth progress label is computed as a normalized distance from a current viewpoint to a goal.

15. The method of claim 11, wherein the loss objective is computed as a linear combination of the first cross-entropy and the second cross-entropy with a weighting parameter adjusting a ratio between the first cross-entropy and the second cross-entropy.

16. The method of claim 11, comprising monitoring progress of navigation of the automated system to ensure that the instruction grounding accurately reflects the navigation progress.

17. The method of claim 11, wherein the action probability is computed by:
generating an encoder context based on the instruction grounding and the visual grounding; and
generating the action probability for the mobile automated system using the encoder context.

18. The method of claim 11, wherein computing the action probability comprises identifying a navigable direction with the highest correlation to the instruction grounding.

19. The method of claim 11, wherein computing the action probability comprises:
identifying a plurality of directions in which the mobile automated system can navigate; and
for each identified navigable direction, generating a respective probability.

20. A non-transitory machine-readable medium comprising executable code which when executed by one or more processors associated with a computing device of a mobile automated system are adapted to cause the one or more processors to perform a method comprising:
receiving, at the computing device, training data comprising one or more training navigation instruction samples;

generating, by a first attention module, an instruction grounding from the training navigation instruction sample for instructing the mobile automated system to navigate an environment in which the mobile automated system is located;

generating, by a second attention module, a visual grounding from one or more training images observed for the environment as the mobile automated system is navigating therethrough at the first time instance;

generating, by a neural model, a progress monitor probability in response to an input of the instruction grounding and the visual grounding;

generating an action probability of navigation directions based on a hidden state of the neural model and the instruction grounding;

train the neural model based at least in part on a first cross entropy between the progress monitor probability and a target progress label, and a second cross-entropy between the action probability and a ground-truth navigable direction; and generating a navigational action for the mobile automated system to navigate the environment by the trained neural model.

* * * * *